(12) United States Patent
Langlotz

(10) Patent No.: US 12,240,458 B1
(45) Date of Patent: *Mar. 4, 2025

(54) VEHICLE GEAR SELECTION CONTROL

(71) Applicant: Bulletproof Property Management, LLC, Cheyenne, WY (US)

(72) Inventor: Bennet Langlotz, Dallas, TX (US)

(73) Assignee: BULLETPROOF PROPERTY MANAGEMENT, LLC, Cheyenne, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,137

(22) Filed: Oct. 27, 2024

Related U.S. Application Data

(63) Continuation of application No. 18/403,221, filed on Jan. 3, 2024, which is a continuation-in-part of application No. 18/205,823, filed on Jun. 5, 2023, now Pat. No. 11,932,230.

(51) Int. Cl.
| | |
|---|---|
| *B60W 30/18* | (2012.01) |
| *B60W 10/10* | (2012.01) |
| *B60W 10/20* | (2006.01) |
| *B60W 50/08* | (2020.01) |
| *B60W 50/10* | (2012.01) |
| *G08G 1/00* | (2006.01) |

(52) U.S. Cl.
CPC ...... *B60W 30/18009* (2013.01); *B60W 10/10* (2013.01); *B60W 10/20* (2013.01); *B60W 50/082* (2013.01); *B60W 50/10* (2013.01); *G08G 1/22* (2013.01); *B60W 2540/12* (2013.01)

(58) Field of Classification Search
CPC ................. B60W 10/10; B60W 10/20; B60W 30/18009; B60W 50/082; B60W 50/10; B60W 2540/12
See application file for complete search history.

(56) References Cited

U.S. PATENT DOCUMENTS

| | | | |
|---|---|---|---|
| 5,436,833 A * | 7/1995 | Janecke | ............... F16H 61/0248 701/52 |
| 9,085,321 B2 | 7/2015 | Noh | |
| 9,219,887 B2 | 12/2015 | Iga et al. | |
| 9,381,922 B2 | 7/2016 | Wysietzki et al. | |
| 11,001,301 B2 | 5/2021 | Joos et al. | |
| 11,623,636 B2 | 4/2023 | Tsujino et al. | |

(Continued)

OTHER PUBLICATIONS

CNET Cars, "Elon Musk explains Auto Shift feature in Model S," YouTube, https://www.youtube.com/watch?v=R4bskxzZvEA, Jun. 11, 2021, Accessed Mar. 25, 2024.

(Continued)

*Primary Examiner* — Edwin A Young
(74) *Attorney, Agent, or Firm* — Bennet K. Langlotz; Langlotz Patent & Trademark Works, LLC

(57) ABSTRACT

A motor vehicle for operation by a driver has a frame with wheels and a motor connected to the frame. A steering control is connected to the wheels to establish a steering angle. A controller is operably connected to the steering control, to the motor, and to the wheels, and is operable to selectably drive the wheels in a forward direction in a drive mode and in a rearward direction in a reverse mode. The controller is operable to select a direction for driving the wheels in response to a pattern of steering angle movements, without operator indication of a direction.

20 Claims, 3 Drawing Sheets

(56) References Cited

U.S. PATENT DOCUMENTS

| | | |
|---|---|---|
| 11,932,230 B1 * | 3/2024 | Langlotz ............... B60W 10/20 |
| 12,049,217 B2 | 7/2024 | Hashimoto |
| 12,065,130 B2 | 8/2024 | Chen et al. |
| 12,084,047 B2 | 9/2024 | Hiei et al. |
| 12,151,677 B2 | 11/2024 | Tamori |
| 2011/0080305 A1 | 4/2011 | Toledo et al. |
| 2013/0110342 A1 * | 5/2013 | Wuttke ................ B62D 15/029 701/23 |
| 2013/0144492 A1 | 6/2013 | Takano et al. |
| 2013/0184979 A1 * | 7/2013 | Karandikar ............ G08G 1/168 701/301 |
| 2016/0075329 A1 * | 3/2016 | Tomozawa ............ B60W 10/20 701/41 |
| 2020/0207334 A1 | 7/2020 | Cho |
| 2020/0404192 A1 * | 12/2020 | Sakurai ..................... B60R 1/27 |
| 2021/0269019 A1 | 9/2021 | Chen et al. |
| 2021/0300349 A1 * | 9/2021 | Hara ................ B60W 30/0956 |
| 2024/0051558 A1 * | 2/2024 | Shivaprasad ....... B60W 50/082 |

OTHER PUBLICATIONS

International Searching Authority, "Notification of Transmittal of the International Search Report and the Written Opinion of the International Searching Authority, or the Declaration," Date of mailing: May 8, 2024, Date search was completed: Apr. 26, 2024.

* cited by examiner

VEHICLE GEAR SELECTION CONTROL

CROSS-REFERENCE TO RELATED APPLICATION

This application is a Continuation of U.S. patent application Ser. No. 18/403,221 filed on Jan. 3, 2024, entitled "VEHICLE GEAR SELECTION CONTROL," which is a Continuation-in-Part of U.S. patent application Ser. No. 18/205,823 filed on Jun. 5, 2023 now issued as U.S. Pat. No. 11,932,230, entitled "VEHICLE GEAR SELECTION CONTROL," which are hereby incorporated by reference in its entirety for all that is taught and disclosed therein.

FIELD OF THE INVENTION

The present invention relates to motor vehicles and operational control systems.

BACKGROUND AND SUMMARY

Traditional motor vehicles have gear selection controls using a lever or physical buttons. Modern vehicles may employ computer touchscreen control, such as swiping up on the left edge of the screen to go forward and down to go in reverse. All these controls have a direction or element associated with each direction, and the driver indicates by the control operation which direction is desired.

In contrast, some vehicles have advanced gear or direction selection is special circumstances. Some may select a direction automatically when initially proceeding from a parked condition. Vehicle vision of other sensors may detect a circumstance in which there is an obstacle such as a wall in one direction and only one apparent direction to proceed. The system may then offer the driver that proposed direction, and the driver then for safety reasons indicates (such as by a tap on the brake) that the proposed direction is safe and correct.

It is notable that the driver confirmation of the direction is provided by a control input that conveys no direction information and is the same input regardless of direction proposed. The switch is a simple binary switch, without multiple positions as in a traditional shift stalk, or different directions to swipe such as on a touch screen interface. In this version, the only input from the driver is acceptance, unless the driver disagrees and inputs the other direction with the usual input selection interface.

It is further noted that the automated vehicle-proposed direction system is limited to starting from a stopped condition, when the vehicle initially is not in gear or being operated. Parking spaces normally may have obstacles on one direction opposite the direction of entry. The existing system is unsuitable for gear changes while underway and operating the vehicle, which are rare except when encountering unexpected obstacles and in routine parking and unparking maneuvers, in which case the user selection of direction is always indicated deliberately each time.

While effective, these gear direction systems may have disadvantages, or have an opportunity for automation to provide convenience. This especially occurs during routine parking when backing out of a parking space, stopping, then selecting the forward drive direction. This may be the only frequent need for a screen swipe to indicate direction in vehicles with sensor initial direction proposals. The screen swipe may be a distraction, require visual observation to reach a small area, and may be a non-intuitive direction for some users. The distractions may arise when in a parking lot context when traffic may come from different direction, when other drivers may have distracted attention, and in which pedestrians and obstacles may be present.

Accordingly, there is a need for a motor vehicle having a frame with wheels and a motor connected to the frame. A steering control is connected to the wheels to establish a steering angle. A controller is operably connected to the steering control, to the motor, and to the wheels, and is operable to selectably drive the wheels in a forward direction in a drive mode and in a rearward direction in a reverse mode. The controller is operable to select a direction for driving the wheels in response to a pattern of steering angle movements, without operator indication of a direction.

DETAILED DESCRIPTION OF A PREFERRED EMBODIMENT

Figure 1:
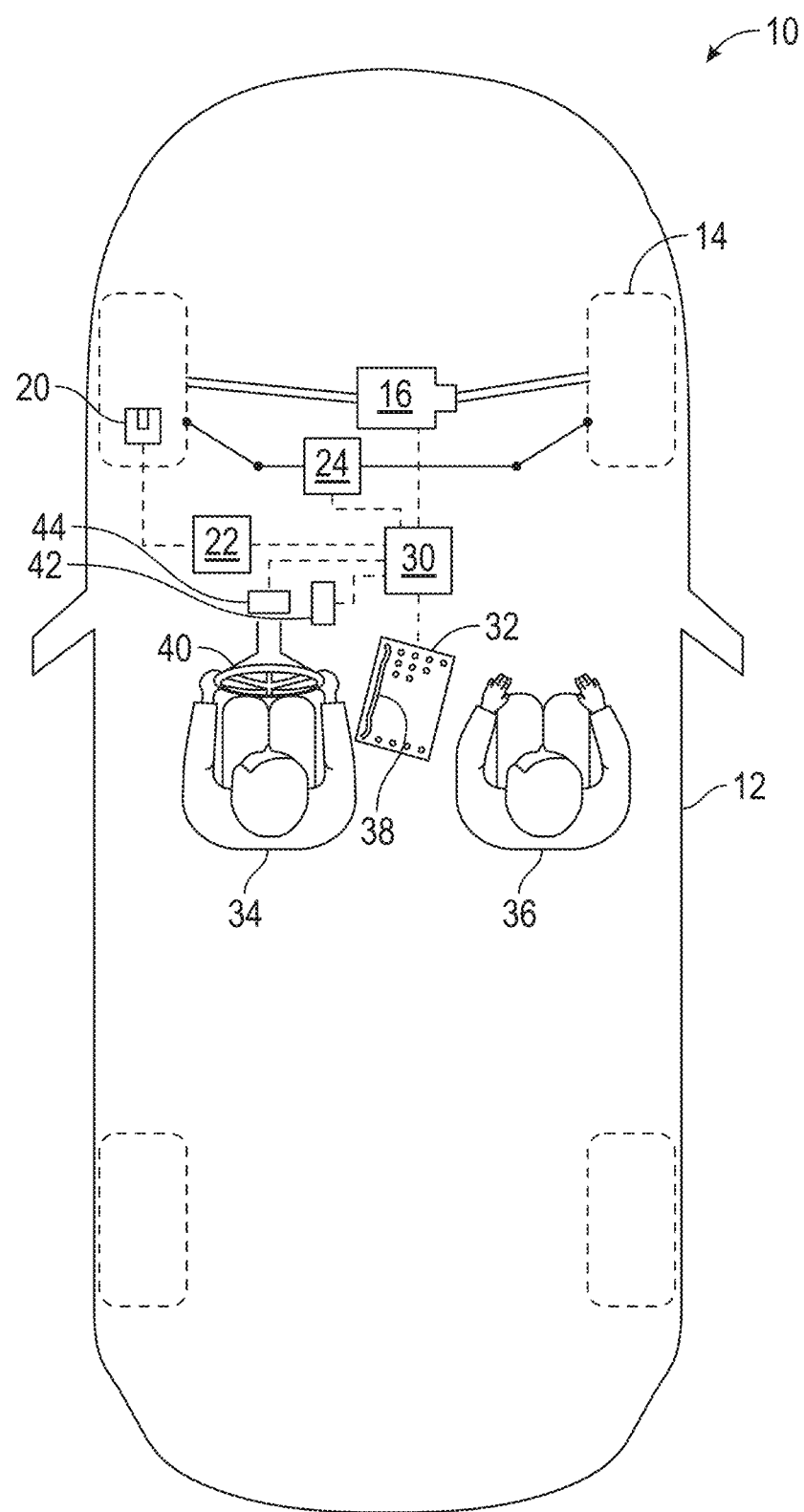
FIG. 1 shows a schematic depiction of a vehicle according to a preferred embodiment of the invention.

As shown schematically in FIG. 1, the system operates in a vehicle 10 having a frame or body 12 having wheels 14 that are driven by a motor 16. Brakes 20 are associated with each wheel and a brake cylinder 22 operates the brakes. A steering system 24 steers the front wheels.

A computer or controller 30 is connected to each of the above systems, including sensors to monitor operation of each system, and cameras or other sensors (not shown) that gather information about the vehicle's environment to enable autonomous or assisted driving. A passenger compartment includes a touchscreen display 32 connected to the controller and visible to a driver 34 and passenger 36 each occupying seats in the compartment. The display provides data entry capability and the controller also connects to audio speakers and microphones in the compartment for sending and receiving audio information with the occupants.

At the driver's side of the display near the left edge as shown, a vertical bar 38 may be displayed to provide a gear shift control. An upward swipe indicates a selection of forward travel in "drive" gear, and downward swipe indicates "reverse" for driving rearward for backing up.

Vehicle controls include a steering wheel or yoke 40 that is connected to the controller and may in some instances be selectably mechanically connected to the steering system 24 to enable direct mechanical control by the driver, electronic control by the driver via the controller, autonomous control by the controller with actuators or the mechanical connection moving the steering wheel in concert with the wheel angle, and combinations of these as selected or indicated by conditions. Similarly, an accelerator pedal 42 and brake pedal 44 are connected respectively to the motor 16, brake system 22, via the controller and optionally with some direct connection for driver and controller control over these functions.

The typical operation of the system is in the context of "unparking," when a driver backs out of a parking spot in reverse, steers to adjust direction while reversing, then shifts to drive, steers the other direction, then straightens out to proceed. This is most typically illustrated in perpendicular head-in parking lot parking, in which the parking space is perpendicular to the aisle for the flow of traffic along the parking spots. An angled parking lot with parking spots indicated with a herringbone pattern of stripes has a similar pattern of operation, with gentler steering angles. Parallel parking has its own configuration. Residential garages and driveways are often like perpendicular parking, but there are many variations.

Each parking context has its own sequence of operations including steering angle and velocity profile. Parking operation normally takes place at slow speeds, so the operation and functions disclosed herein may be limited to circumstances below a selected speed, or within parameters of a function based in part on speed.

Figure 2:
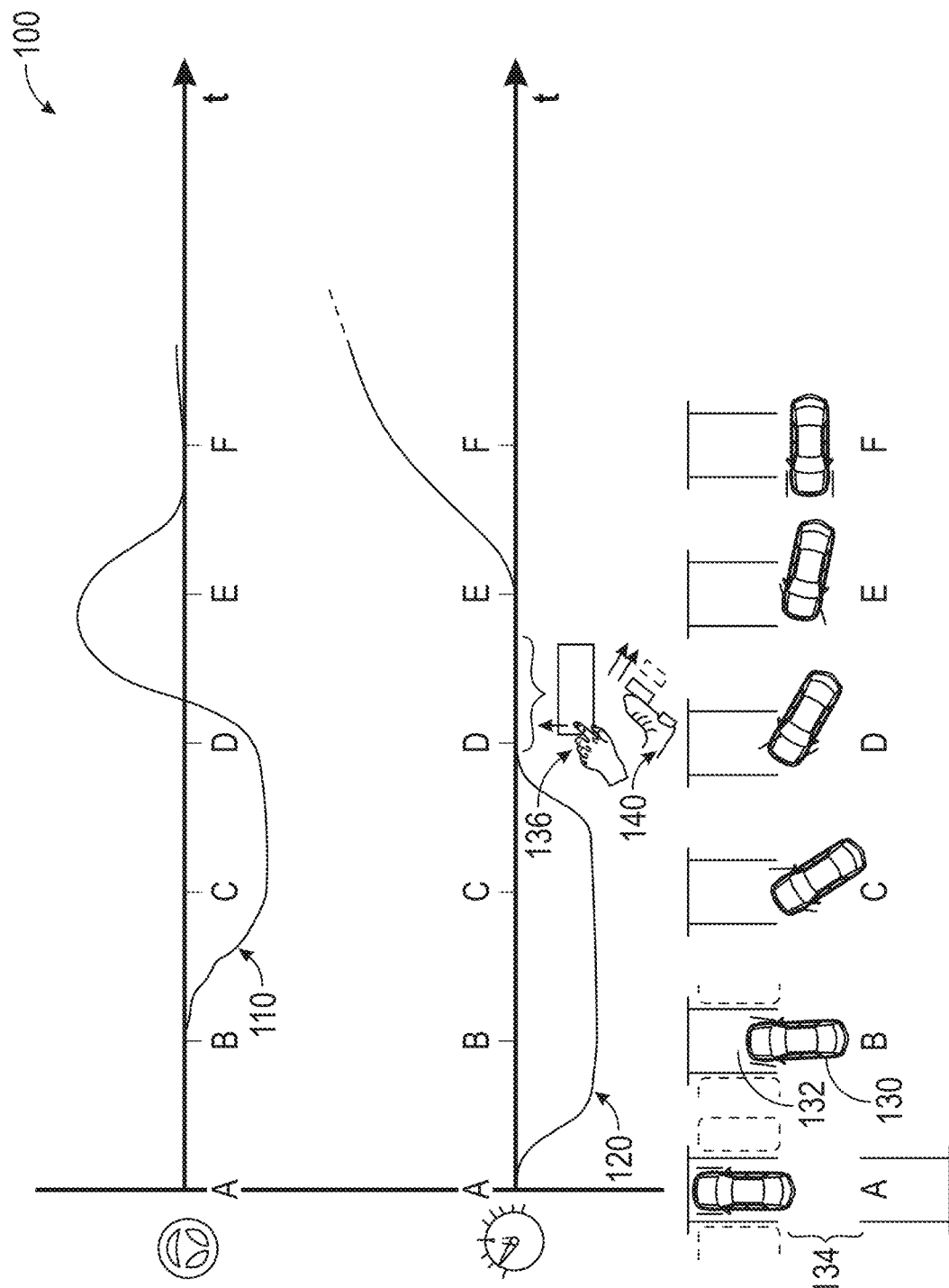
FIG. 2 shows a chart depicting vehicle operation in a selected maneuver.

FIG. 2 is a chart 100 that illustrates the sequence of unparking. The upper trace 110 indicates steering wheel angle on a time-based horizontal chart. The lower trace 120 indicates velocity. The lower images A-F depict the vehicle 130 in a parking space 132, and are located at their relative positions on the time axis. At position A, the vehicle is parked, with steering wheel straight, front wheels in line with the axis of the vehicle, and zero velocity. The vehicle maintains the steering wheel at zero steering angle as it accelerates to a slow speed to move straight rearward.

As it moves to the rear, position B indicates when the nose of the vehicle is clear of adjacent parked cars and may now be turned to a significant angle to enable the vehicle to curve with a tight radius due to presumed obstacles on the other side of the parking lot aisle 134 it is backing into.

The vehicle continues rearward through position C, with wheels turned sharply, then after it passes C and approaches an angle that enables forward departure past the adjacent vehicle that was to its left, the vehicle slows to a stop at D.

The wheel angle may begin reducing before D, but between D and E, the vehicle is briefly stopped, and the vehicle is manually shifted from reverse to drive as shown in the existing prior art screen swipe 136 or (in the case of the preferred embodiment) may be suggested by the vehicle based on presumptions discussed in detail below, and preferably confirmed by the driver by an approval response such as a brake tap sequence 140 or other non-direction indicating signal such as a button click, voice command, or visually-detected gesture. During the stopped D-E period, the wheel is turned sharply from one direction away from straight, back past straight, and to the opposite direction to clear the adjacent vehicle as it proceeds forward.

Beyond E, the vehicle drives forward at increasing speeds that are above a threshold normally reserved for parking operations and higher for parking lot transit, or roadways that may serve as the "aisle."

An important concern for the preferred embodiment is in which limited circumstances to have the controller enable auto-shifting, and to propose or enact a shift in direction without user indication of the direction, and preferably with only an indication of approval.

The controller may be programmed with specific functions or algorithms as to when an auto-shift is clearly safe to offer or enact, and when if offered, acceptance by the driver is likely desired and not an unwanted distraction. The controller may be programmed by artificial intelligence data derived from multitudes of parking lot navigations to determine actual patterns when auto-shifting might be safely offered, avoiding simpler criteria and functions as offered below for simplicity. However, if the disclosed functions are based on wheel angle patterns, velocity patterns, with certain thresholds of their various amounts, derivatives, and integrals, it is believed that typical drivers will naturally be following certain functions of the same parameters, and AI systems would simply derive the rules from typical driver behavior. In such embodiments the driver may be offered an auto-shift (or an auto shift implemented without consent) only when the likelihood of it being desired is greater than a preselected threshold, and when other safety criteria are met.

Figure 3:
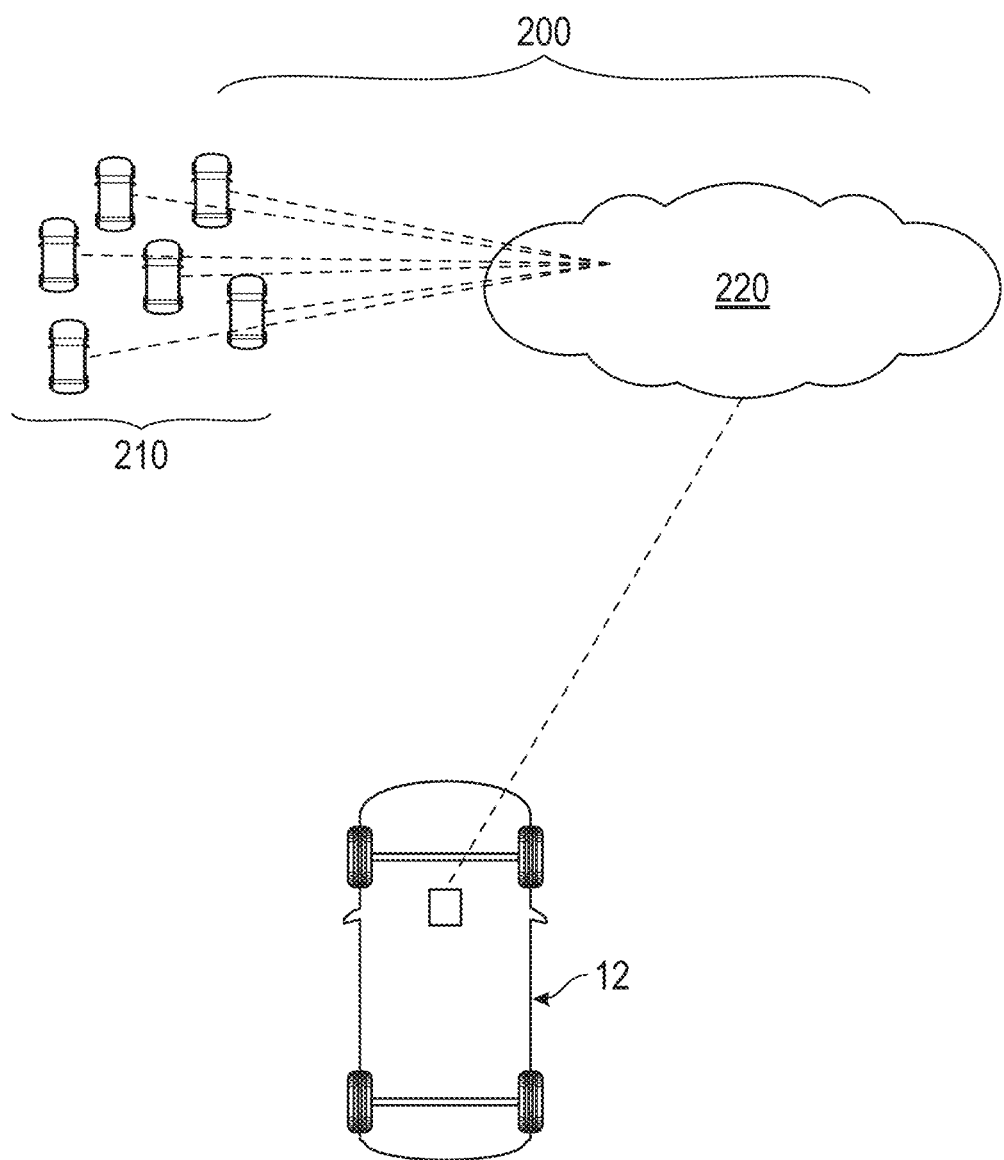
FIG. 3 shows a system including a network of vehicles training a central controller.

FIG. 3 shows an AI system 200 employing these principles. The system operates with a network or fleet 210 of a multitude of vehicles operating normally by private owners to train a central system 220 with immense processing ability to receive and analyze the video and input data from the fleet. The central system may be otherwise occupied to gather driving data to provide all other aspects of self-driving or autonomous vehicle operation. The fleet vehicles may be selected or curated as superior or model drivers.

The fleet vehicle behavior when naturally engaging in gear changing (typically Reverse to Drive) is recorded over multitudes of cases, including edge cases with unusual circumstances. The recorded behavior data may be video streams from vehicle cameras, and vehicle control inputs such as steering angle, accelerator and brake usage, and gear changing inputs. From these interactions, the central system learns the patterns and combinations of inputs that suggest with a selected degree of confidence that a gear change is desired, and should be enacted or offered for the user driver ratification. The user driver vehicle processor employs the network-learned behavior patterns without necessarily having preprogrammed algorithms or rules for the conditions (ranges of velocities, accelerations, durations, or angles, etc.) suggesting a gear change is desired. The system simply refers to the mass of fleet behavioral data to find confident commonalities of circumstances.

One criterion is vehicle speed. Obviously, the shifting is offered only for when the vehicle is essentially stationary or at near zero speed. But the speed prior to this, when departing the parking spot between positions B and C, may be pertinent to the question of whether the vehicle is intentionally unparking. The function may be based on maximum speed, or an average speed over a certain distance. Above a certain speed, auto shift would never be offered, and even speeds that might be common but not ideal for unparking might not receive an auto-shift offer. This would serve to train cautious driver behavior, especially if the entity determining the thresholds were associated with vehicle insurance liability.

Another criterion is steering angle. Large steering angles are associated with slower speeds, and only slight angles are used at high speeds. But beyond speed alone, steering angles are larger for unparking. While a capacious parking lot with wide aisles might not require as sharp steering angles, they may still follow clear patterns to offer auto-shift.

Position is another element. Velocity and steering angle thresholds may be adequate, but more details patterns will tend to be associated with unparking. As shown, the vehicle proceeds for about one car length from A to B before introducing steering angle. It then proceeds for another limited distance related to conditions and vehicle length with a substantial steering angle.

Speed, steering angle, and position may be determined by sensors on the vehicle, or may be calculated or inferred by other sources, including vehicle cameras or vision systems that create a model of the environment and the vehicle's relationship to it, and GPS and other sensors.

Reversing the steering angle when slowing or after stopping is the final signal preferably to verify the appropriateness of an auto-shift offer.

Errors of enacted shifts are intolerable as they may cause accidents, so approval preferably needs to be indicated before an offered shift is enacted. Approval may be withheld in cases in which the driver may reverse for a time, give some indications of unparking, then proceed farther to the rear. The system should assess whether the vehicle has backed out enough and to a suitable angle to enable departure without conflict, so that if inadequately backed out, a premature auto-shift offer is not made.

Approval may be indicated in a wide range of ways. With the driver's foot on the brake for slowing to a stop after reversing, brake operation is one option. After stopping, the driver might release and tap the brake to accept the shift. With many vehicles offering one-pedal driving, and slowing automatically as the accelerator pedal is released, the driver's foot might shift over to tap the brake.

Acceptance can be indicated by clicking any button, operating any control, tapping the screen (but without needing to indicate a direction as the vehicle has offered the direction and no indication is needed). Voice consent may be provided, and a driver may gesture to accept, such as by a head nod indicating approved forward movement, as recognized by a cabin camera viewing the driver. Vehicles with scroll buttons on opposite sides of the steering wheel accessible to thumbs are well suited to serve as consent input, such as by clicking both wheels simultaneously.

Unparking from angled spaces on a street curb or a parking lot with aisles will be similar, and have some differences due to different geometries. For instance, steering angles will differ, and velocities may be necessarily brisker when pulling into a roadway to clear traffic. Auto-shifting may reduce exposer to traffic and enable safe unparking with smaller traffic gaps by reducing the D-E time period that would be taken enacting a manual shift, with the attendant distraction.

Unparking from parallel parking is more complex and has its own patterns, but the system could learn or implement these patterns. Parallel parking is much like backing into a perpendicular parking spot, in that the driver begins by going past an open parking spot, should have signaled, and then backs up into the spot. This is potentially challenging because one normally doesn't shift to reverse upon simply pausing in a parking lot or a city street with parallel spaces beside. But in special detected circumstances the auto-shift can be proposed by the system. Based on sensing an available spot, preferably in the context of a known arrival at a navigated destination, optionally based on turn signal actuation to indicate a desire to park in a detected available space at the destination. Auto-park offering may be limited only when navigating and having arrived at a programmed destination.

In some embodiments, the system may be trained based on location, with the vehicle controller having a GPS system that identifies the vehicle location. This may be employed to provide confident suggestions of auto shift at a frequent location (such as home and packing out of a garage or driveway before turning and shifting into drive) where the vehicle follows the same pattern essentially every time. "Always shift here" is a useful command to enable to driver to ensure that a shift is suggested. In certain circumstances, the shift may even be optionally made automatically without requiring driver approval. Locations other than home (such as work, or any place frequented) may be used to offer an auto-shift option by the vehicle prompting the user to ask whether they want to always auto shift at that location.

Some systems may gain enough information about whether to offer auto-shift upon initial arrival at a parking space, based on the images collected by the vehicle vision system as it approaches and enters the parking space. It may be unnecessary to gather more info by the vehicle's operation upon exiting the spot as is proposed above.

Other systems may simply employ distance traveled information, offering an auto-shift any time a vehicle reverses and stops within a selected distance typical for such parking lots (such as 2-3 car lengths). This would avoid offering an auto shift upon vehicle stoppage such as might occur to yield to cross traffic when having reversed less than a car length, although an offer of auto-shift may be ignored.

The system may also employ vehicle location data from GPS or geofence and enable or disable the auto-shift based on location. The feature may be limited to a user's home where the driving action is consistent every day, and disabled in public parking lots. It may be enabled at "favorite" locations where there may be consistency or other basis for driver confidence or need for convenience. This may be treated like suspension adjustments that are enabled at certain locations and may be offered as a "do you want to auto-shift at this location in the future?" prompt.

The invention claimed is:

1. A motor vehicle comprising:
a frame having wheels;
a motor connected to the frame;
a steering control connected to the wheels to establish a steering angle;
a drive system operably connected to the steering control, to the motor, and to the wheels;
the drive system operable to selectably drive the wheels in a forward direction in a drive mode and in a rearward direction in a reverse mode; and
the drive system operable to select a direction for driving the wheels in response to steering angle movements, without operator indication of a direction.

2. The motor vehicle of claim 1 including a brake control operable by a driver to generate a brake input, and wherein the drive system is operably connected to the brake control to receive the brake input, and wherein an approval indication includes actuation of the brake control.

3. The motor vehicle of claim 2 wherein the drive system includes an accelerator pedal operable to slow the vehicle in response to release of the accelerator pedal, and wherein operation of the brake control for the approval indication includes the driver's foot shifting from the accelerator pedal to tap the brake control.

4. The motor vehicle of claim 1 wherein the drive system is operable to offer a driver a change in the drive direction only in response to detecting a steering input greater than a selected steering angle threshold.

5. The motor vehicle of claim 1 wherein the drive system is operable to offer a driver a change in the drive direction only if a vehicle velocity is below a selected velocity threshold.

6. The motor vehicle of claim 1 wherein the drive system is operable to change the drive direction only in response to a steering input indicating steering in a first direction, then indicating steering in the opposite direction.

7. The motor vehicle of claim 1 wherein the drive system is operable to offer a driver a change in the drive direction based at least in part on distance traveled.

8. The motor vehicle of claim 1 wherein the drive system is operable in response to an approval indication from a driver to change the drive direction without driver indication of a direction other than approval of an offered change in direction.

9. The motor vehicle of claim 1 wherein the drive system is operable in response to an approval indication from a driver to change the drive direction without operation of a selector by the driver.

10. The motor vehicle of claim 1 including a brake control operable by a driver to generate a brake input, and wherein the drive system is operably connected to the brake control to receive the brake input, and wherein the drive system is operable in response to driving a first direction with steering angle in a first steering direction, then changing steering to an opposite second steering direction, to change drive direction in response to operation of the brake control by the driver.

11. A motor vehicle comprising:
a frame having wheels;
a motor connected to the frame;
a steering control connected to the wheels to establish a steering angle;
a controller operably connected to the steering control, to the motor, and to the wheels;
the controller operable to selectably drive the wheels in a forward direction in a drive mode and in a rearward direction in a reverse mode; and
the controller operable to select a direction for driving the wheels in response to steering angle movements, without operator indication of a direction.

12. The motor vehicle of claim 11 including a brake control operable by driver to generate a brake input, and wherein the controller is operably connected to the brake control to receive the brake input, and wherein an approval indication includes actuation of the brake control.

13. The motor vehicle of claim 12 wherein the controller includes an accelerator pedal operable to slow the vehicle in response to release of the accelerator pedal, and wherein operation of the brake control for the approval indication includes the driver's foot shifting from the accelerator pedal to tap the brake control.

14. The motor vehicle of claim 11 wherein the controller is operable to offer a driver a change in the drive direction only in response to detecting a steering input greater than a selected steering angle threshold.

15. The motor vehicle of claim 11 wherein the controller is operable to offer a driver a change in the drive direction only if a vehicle velocity is below a selected velocity threshold.

16. The motor vehicle of claim 11 wherein the controller is operable to change the drive direction only in response to a steering input indicating steering in a first direction, then indicating steering in the opposite direction.

17. The motor vehicle of claim 11 wherein the controller is operable to offer a driver a change in the drive direction based at least in part on distance traveled.

18. The motor vehicle of claim 11 wherein the controller is operable in response to an approval indication from a driver to change the drive direction without driver indication of a direction other than approval of an offered change in direction.

19. The motor vehicle of claim 11 wherein the controller is operable in response to an approval indication from a driver to change the drive direction without operation of a selector by the driver.

20. The motor vehicle of claim 11 including a brake control operable by a driver to generate a brake input, and wherein the controller is operably connected to the brake control to receive the brake input, and wherein the controller is operable in response to driving a first direction with the steering angle in a first steering direction, then changing steering to an opposite second steering direction, to change drive direction in response to operation of the brake control by the driver.

* * * * *